US012656759B2

(12) United States Patent
Gaur et al.

(10) Patent No.: US 12,656,759 B2
(45) Date of Patent: Jun. 16, 2026

(54) SYSTEM AND METHOD FOR CONTROLLING A MACHINE USING DIMENSIONALLY AWARE RULE EXTRACTION

(71) Applicants: Board of Trustees of Michigan State University, East Lansing, MI (US); GM GLOBAL TECHNOLOGY OPERATIONS LLC, Detroit, MI (US)

(72) Inventors: Abhinav Gaur, Lansing, MI (US); Kalyanmoy Deb, Okemos, MI (US); Debejyo Chakraborty, Novi, MI (US); Jeffrey A. Abell, Rochester Hills, MI (US)

(73) Assignees: Board of Trustees of Michigan State University, East Lansing, MI (US); GM Global Technology Operations LLC, Detroit, MI (US)

( * ) Notice: Subject to any disclaimer, the term of this patent is extended or adjusted under 35 U.S.C. 154(b) by 375 days.

(21) Appl. No.: 18/539,822

(22) Filed: Dec. 14, 2023

(65) Prior Publication Data

US 2024/0118682 A1 Apr. 11, 2024

Related U.S. Application Data

(63) Continuation-in-part of application No. 17/194,534, filed on Mar. 8, 2021, now abandoned.

(Continued)

(51) Int. Cl.
*G05B 19/418* (2006.01)

(52) U.S. Cl.
CPC ... *G05B 19/41835* (2013.01); *G05B 19/4183* (2013.01); *G05B 19/41855* (2013.01);
(Continued)

(58) Field of Classification Search
None
See application file for complete search history.

(56) References Cited

U.S. PATENT DOCUMENTS 3,784,079 A 1/1974 Spanjer
6,198,071 B1 3/2001 Kitsunai
(Continued)

OTHER PUBLICATIONS

Siemens-PLM-HEEDS, "We help you discover better designs, faster," https://www.plm.automation.siemens.com/global/en/products/simcenter/simcenter-heeds.html, 2004, [Online].
(Continued)

*Primary Examiner* — Bernard G Lindsay
(74) *Attorney, Agent, or Firm* — Harness, Dickey & Pierce, PLC

(57) ABSTRACT

A system includes a memory storing a dimensionally aware model generated based on a training set and guided by feature dimensions and instructions for execution a processor. The instructions include, in response to receiving a set of data from a user device, identifying a set of features from the set of data and applying the dimensionally aware model to the set of features by implementing a boundary representation. The instructions include classifying the set of features as acceptable in response to the implementation of the boundary representation indicating the set of features are outside the boundary representation, classifying the set of features as unacceptable in response to the implementation of the boundary representation indicating the set of features are inside the boundary representation, generating, for display on the user device, an alert based on the classification and controlling a user device to obtain product features within the boundary representation.

27 Claims, 9 Drawing Sheets

Related U.S. Application Data

(60) Provisional application No. 62/987,142, filed on Mar. 9, 2020.

(52) U.S. Cl.
CPC .............. *G05B 2219/39132* (2013.01); *G05B 2219/45135* (2013.01)

(56) References Cited

U.S. PATENT DOCUMENTS

| | | | |
|---|---|---|---|
| 6,515,742 | B1 | 2/2003 | Ruprecht |
| 2007/0163349 | A1 | 7/2007 | Johansen et al. |
| 2013/0099907 | A1 | 4/2013 | Ching et al. |
| 2013/0178953 | A1 | 7/2013 | Wersborg et al. |
| 2014/0138012 | A1 | 5/2014 | Spicer et al. |
| 2016/0354974 | A1 | 12/2016 | Wang et al. |
| 2019/0219994 | A1 | 7/2019 | Yan et al. |
| 2020/0067969 | A1 | 2/2020 | Abbaszadeh et al. |
| 2020/0134510 | A1* | 4/2020 | Basel .................... G06F 16/285 |
| 2021/0208545 | A1 | 7/2021 | Zhang et al. |
| 2021/0272704 | A1* | 9/2021 | Sudo .................... G06N 3/0442 |
| 2021/0405544 | A1 | 12/2021 | Werkman et al. |
| 2022/0184810 | A1 | 6/2022 | Beck et al. |

OTHER PUBLICATIONS

Esteco-modeFrontier, "Process automation and optimization in the engineering design process," https://www.esteco.com/modefrontier, 1998, [Online].

Dassault-iSight, "Automate Design Exploration and Optimization," https://www.3ds.com/products-services/simulia/products/isight-simulia-execution-engine/, 1996, [Online].

Noesis-Optimus, "The Industry-Leading PIDO Software Platform," https://www.noesissolutions.com/our-products/optimus/, 2008, [Online].

Dynardo-optiSlang, "Robust Design Optimization (RDO) in virtual product development," https://www.dynardo.de/en/software/optislang.html, 2002, [Online].

C. A. C. Coello, G. B. Lamont, D. A. Van Veldhuizen et al., "Evolutionary algorithms for solving multi-objective problems". Springer, 2007, vol. 5.

H. J. Levesque, "\Knowledge representation and reasoning," Annual review of computer science, vol. 1, No. 1, pp. 255-287, 1986.

R. Davis, H. Shrobe, and p. Szolovits, "What is a knowledge representation?" AI magazine, vol. 14, No. 1, pp. 17-17, 1993.

D. P. Bertsekas, A. Nedi, A. E. Ozdaglar et al., Convex analysis and optimization. Athena Scientific, 2003.

K. Deb and A. Srinivasan, "Innovization: Innovating design principles through optimization," in Proceedings of the 8th annual conference on Genetic and evolutionary computation. ACM, 2006, pp. 1629-1636.

S. Bandaru and K. Deb, "Automated discovery of vital knowledge from pareto-optimal solutions: First results from engineering design," in Evolutionary Computation (CEC), 2010 IEEE Congress on. IEEE, 2010, pp. 1-8.

"Higher and lower-level knowledge discovery from pareto-optimal sets," Journal of Global Optimization, vol. 57, No. 2, pp. 281-298, 2013.

A. Ng, K. Deb, and C. Dudas, "Simulation-based innovization for production systems improvement: An industrial case study," in Proceedings of The International 3rd Swedish Production Symposium, SPS'09, Goteborg, Sweden, Dec. 2-3, 2009. The Swedish Production Academy, 2009, pp. 278-286.

S. Bandaru, A. H. Ng, and K. Deb, "Data mining methods for knowledge discovery in multi-objective optimization: Part a-survey," Expert Systems with Applications, vol. 70, pp. 139-159, 2017.

I. Nonaka and H. Takeuchi, The knowledge-creating company: How Japanese companies create the dynamics of innovation. Oxford university press, 1995.

A. Inselberg, "The plane with parallel coordinates," The visual computer, vol. 1, No. 2, pp. 69-91, 1985.

A. M. Geoffrion, J. S. Dyer, and A. Feinberg, "An interactive approach for multicriterion optimization, with an application to the operation of an academic department," Management science, vol. 19, No. 4-part-1, pp. 357-368, 1972.

K. J. Chichakly and M. J. Eppstein, "Discovering design principles from dominated solutions." IEEE Access, vol. 1, No. iii, pp. 275-289, 2013.

S. Obayashi and D. Sasaki, "Visualization and data mining of pareto solutions using self-organizing map," in International Conference on Evolutionary Multi-Criterion Optimization. Springer, 2003, pp. 796-809.

A. H. Ng, C. Dudas, J. Nieen, and K. Deb, "Simulation-based innovization using data mining for production systems analysis," in Multi-objective Evolutionary Optimisation for Product Design and Manufacturing. Springer, 2011, pp. 401-429.

T. W. Simpson, J. Poplinski, P. N. Koch, and J. K. Allen, "Metamodels for computerbased engineering design: survey and recommendations," Engineering with computers, vol. 17, No. 2, pp. 129-150, 2001.

B. Kim, R. Khanna, and O. O. Koyejo, "Examples are not enough, learn to criticize! criticism for interpretability," in Advances in Neural Information Processing Systems, 2016, pp. 2280-2288.

M. E. Newman, "Power laws, pareto distributions and zipf's law," Contemporary physics, vol. 46, No. 5, pp. 323-351, 2005.

W. Liu, Z. Wang, X. Liu, N. Zeng, Y. Liu, and F. E. Alsaadi, "A survey of deep neural network architectures and their applications," Neurocomputing, vol. 234, pp. 11-26, 2017.

C. Molnar, Interpretable Machine Learning, 2019, accessed: Apr. 16, 2019.

P. W. Bridgman, Dimensional analysis. Yale university press, 1922.

W. Banzhaf, P. Nordin, R. E. Keller, and F. D. Francone, Genetic programming: an introduction. Morgan Kaufmann San Francisco, 1998, vol. 1.

C. Myburgh and K. Deb, "Derived heuristics-based consistent optimization of material ow in a gold processing plant," Engineering optimization, vol. 50, No. 1, pp. 1-18, 2018.

K. Deb and R. Datta, "Hybrid evolutionary multi-objective optimization and analysis of machining operations," Engineering Optimization, vol. 44, No. 6, pp. 685-706, 2012.

D. C. Montgomery, E. A. Peck, and G. G. Vining, Introduction to linear regression analysis. John Wiley & Sons, 2012, vol. 821.

K. Deb, Multi-objective optimization using evolutionary algorithms. John Wiley & Sons, 2001, vol. 16.

J. Nocedal and S. Wright, Numerical optimization. Springer Science & Business Media, 2006.

D. Goldberg, Genetic Algorithms in Search, Optimization and Machine Learning, 1st ed. Boston, MA, USA: Addison-Wesley Longman Publishing Co., Inc., 1989.

H.-P. P. Schwefel, Evolution and optimum seeking: the sixth generation. John Wiley & Sons, Inc., 1993.

J. R. Koza, Genetic programming: on the programming of computers by means of natural selection. MIT press, 1992, vol. 1.

C. A. C. Coello, D. A. VanVeldhuizen, and G. Lamont, Evolutionary Algorithms for Solving Multi-Objective Problems. Boston, MA: Kluwer, 2002.

S. M. Sait, H. Youssef, and J. A. Khan, "Fuzzy evolutionary algorithm for vlsi placement," in Proceedings of the 3rd Annual Conference on Genetic and Evolutionary Computation. Morgan Kaufmann Publishers Inc., 2001, pp. 1056-1063.

J. E. Rodriguez, A. L. Medaglia, and J. P. Casas, "Approximation to the optimum design of a motorcycle frame using finite element analysis and evolutionary algorithms," in 2005 IEEE Design Symposium, Systems and Information Engineering. IEEE, 2005, pp. 277-285.

Y.-J. Kim and J. Ghaboussi, "A new genetic algorithm based control method using state space reconstruction," in Proceedings of the Second World Conference on Struc. Control, 1998, pp. 2007-2014.

K. Harada, K. Ikeda, and S. Kobayashi, "Hybridization of genetic algorithm and local search in multiobjective function optimization: recommendation of ga then Is," in Proceedings of the 8th annual conference on Genetic and evolutionary computation. ACM, 2006, pp. 667-674.

(56) References Cited

OTHER PUBLICATIONS

S. P. Harris and E. C. Ifeachor, "Nonlinear fir filter design by genetic algorithm," in Proceedings of the First Online Workshop on Soft Computing (WSC1), 1996, pp. 216-221.

F. Y. Cheng and D. Li, "Multiobjective optimization design with pareto genetic algorithm," Journal of Structural Engineering, vol. 123, No. 9, pp. 1252-1261, 1997.

M. S. Bright, "Evolutionary strategies for the high-level synthesis of vlsi-based dsp systems for low power," Ph.D. dissertation, University of Wales. Cardiff, 1998.

A. Belegundu, E. Constans, R. Salagame, and D. Murthy, "Multiobjective optimization of laminated ceramic composites using genetic algorithms," in 5th Symposium on Multidisciplinary Analysis and Optimization, 1994, p. 4363.

Deb, S. Bandaru, D. Greiner, A. Gaspar-Cunha, and C. C. Tutum, "An integrated approach to automated innovization for discovering useful design principles: Case studies from engineering," Applied Soft Computing, vol. 15, pp. 42-56, 2014.

M. W. Mkaouer, M. Kessentini, S. Bechikh, K. Deb, and M. O Cinneide, "Recommendation system for software refactoring using innovization and interactive dynamic optimization," in Proceedings of the 29th ACM/IEEE international conference on Automated software engineering. ACM, 2014, pp. 331-336.

K. Deb and A. Srinivasan, "Innovization: Discovery of innovative design principles through multiobjective evolutionary optimization," in Multiobjective Problem Solving from Nature. Springer, 2008, pp. 243-262.

S. Bandaru, C. C. Tutum, K. Deb, and J. H. Hattel, "Higher-level innovization: A case study from friction stir welding process optimization," in Evolutionary Computation (CEC), 2011 IEEE Congress on. IEEE, 2011, pp. 2782-2789.

S. Bandaru, "Automated innovization: Knowledge discovery through multi-objective optimization," Ph.D. dissertation, Indian Institute of Technology-Kanpur, Dept. of Mechanical Engineering, India, 2012.

K. Deb, S. Gupta, D. Daum, J. Branke, A. K. Mall, and D. Padmanabhan, "Reliabilitybased optimization using evolutionary algorithms," IEEE Transactions on Evolutionary Computation, vol. 13, No. 5, pp. 1054-1074, 2009.

S. Bandaru and K. Deb, "Temporal innovization: Evolution of design principles using multi-objective optimization," in International Conference on Evolutionary Multi-Criterion Optimization. Springer, 2015, pp. 79-93.

A. H. Ng, S. Bandaru, and M. Frantzen, "Innovative design and analysis of production systems by multi-objective optimization and data mining," Procedia CIRP, vol. 50, pp. 665-671, 2016.

Meyer and K. Sugiyama, "The concept of knowledge in km: a dimensional model," Journal of knowledge management, vol. 11, No. 1, pp. 17-35, 2007.

P. Homan, G. Grinstein, K. Marx, I. Grosse, and E. Stanley, "Dna visual and analytic data mining," in Proceedings. Visualization'97 (Cat. No. 97CB36155). IEEE, 1997, pp. 437-441.

I. Hatzilygeroudis and J. Prentzas, "Integrating (rules, neural networks) and cases for knowledge representation and reasoning in expert systems," Expert Systems with Applications, vol. 27, No. 1, pp. 63-75, 2004.

J. Shawe-Taylor and N. Cristianini, An Introduction to Support Vector Machines and Other Kernel-based Learning Methods. Cambridge University Press, 2000.

M. H. Hassoun, Fundamentals of Artificial neural networks. Cambridge: MIT Press, 1995.

G. Hinton and T. J. Sejnowski, Unsupervised Learning: Foundations of Neural Com- putation, 1st ed. MIT Press, 1999.

N. Hitomi, H. Bang, and D. Selva, "Extracting and applying knowledge with adaptive knowledge-driven optimization to architect an earth observing satellite system, " in AIAA Information Systems-AIAA Infotech@ Aerospace, 2017, p. 0794.

B. L. W. H. Y. Ma, B. Liu, and Y. Hsu, "Integrating classification and association rule mining," in Proceedings of the fourth international conference on knowledge discovery and data mining, 1998, pp. 24-25.

S. Bandaru and K. Deb, "Towards automating the discovery of certain innovative design principles through a clustering-based optimization technique," Engineering op-timization, vol. 43, No. 9, pp. 911-941, 2011.

A. H. Ng, C. Dudas, J. Niessen, and K. Deb, "Simulation-based innovization using data mining for production systems analysis," in Multi-objective Evolutionary Optimisation for Product Design and Manufacturing. Springer, 2011, pp. 401-429.

N. R. Draper and H. Smith, Applied regression analysis. John Wiley & Sons, 2014, vol. 326.

Y. Bernstein, X. Li, V. Ciesielski, and A. Song, "Multiobjective parsimony enforcement for superior generalisation performance," in Proceedings of the 2004 Congress on Evolutionary Computation (IEEE Cat. No. 04TH8753), vol. 1. IEEE, 2004, pp. 83-89.

E. D. De Jong and J. B. Pollack, "Multi-objective methods for tree size control," Genetic Programming and Evolvable Machines, vol. 4, No. 3, pp. 211-233, 2003.

H. Iba, "Bagging, boosting, and bloating in genetic programming," in Proceedings of the 1st Annual Conference on Genetic and Evolutionary Computation-vol. 2. Morgan Kaufmann Publishers Inc., 1999, pp. 1053-1060.

D. LLC. (2018) Eureqa : The a.i .-powered modeling engine by datarobot. [Online]. Available: https://www.nutonian.com/products/eureqa/.

C. W. Ahn and R. S. Ramakrishna, "On the scalability of real-coded bayesian optimization algorithm," IEEE Transactions on Evolutionary Computation, vol. 12, No. 3, pp. 307-322, 2008.

M. Pelikan, D. E. Goldberg, and E. Cantu-Paz, "Boa: The bayesian optimization algorithm," in Proceedings of the 1st Annual Conference on Genetic and Evolutionary Computation—vol. 1. Morgan Kaufmann Publishers Inc., 1999, pp. 525-532.

A. Zhou, Q. Zhang, and Y. Jin, "Approximating the set of pareto-optimal solutions in both the decision and objective spaces by an estimation of distribution algorithm," IEEE transactions on evolutionary computation, vol. 13, No. 5, pp. 1167-1189, 2009.

A. H. Ng, C. Dudas, H. Bostr om, and K. Deb, "Interleaving innovization with evolutionary multi-objective optimization in production system simulation for faster convergence," in Learning and Intelligent Optimization. Springer, 2013, pp. 1-18.

R. S. Michalski, G. Cervone, and K. Kaufman, "Speeding up evolution through learning: Lem," in Intelligent Information Systems. Springer, 2000, pp. 243-256.

M. Keijzer and V. Babovic, "Dimensionally aware genetic programming," in Proceedings of the 1st Annual Conference on Genetic and Evolutionary Computation—vol. 2. Morgan Kaufmann Publishers Inc., 1999, pp. 1069-1076.

A. Ratle and M. Sebag, "Genetic programming and domain knowledge: Beyond the limitations of grammar-guided machine discovery," in Parallel Problem Solving from Nature PPSN VI. Springer, 2000, pp. 211-220.

R. I. Mckay, N. X. Hoai, P. A. Whigham, Y. Shan, and M. Oneill, "Grammar-based genetic programming: a survey," Genetic Programming and Evolvable Machines, vol. 11, No. 3-4, pp. 365-396, 2010.

D. J. Montana, "Strongly typed genetic programming," Evolutionary computation, vol. 3, No. 2, pp. 199-230, 1995.

M. Keijzer and V. Babovic, "Declarative and preferential bias in gp-based scientific discovery," Genetic Programming and Evolvable Machines, vol. 3, No. 1, pp. 41-79, 2002.

A. Ashour, L. Alvarez, and V. Toropov, "Empirical modelling of shear strength of rc deep beams by genetic programming," Computers & structures, vol. 81, No. 5, pp. 331-338, 2003.

S. Bandaru and K. Deb, "A dimensionally-aware genetic programming architecture for automated innovization," in International Conference on Evolutionary Multi-Criterion Optimization. Springer, 2013, pp. 513-527.

N. Padhye and K. Deb, "Multi-objective optimisation and multi-criteria decision making in sls using evolutionary approaches," Rapid Prototyping Journal, vol. 17, No. 6, pp. 458-478, 2011.

K. Deb and K. Sindhya, "Deciphering innovative principles for optimal electric brushless dc permanent magnet motor design," in

US 12,656,759 B2

Page 4

(56)           References Cited

OTHER PUBLICATIONS

2008 IEEE Congress on Evolutionary Computation (IEEE World Congress on Computational Intelligence). IEEE, 2008, pp. 2283-2290.
G. A. Seber and A. J. Lee, Linear regression analysis. John Wiley & Sons, 2012, vol. 329.
P. Berkhin, "A survey of clustering data mining techniques," in Grouping multidimensional data. Springer, 2006, pp. 25-71.
T. S. Jaakkola and D. Haussler, "Probabilistic kernel regression models." in AISTATS, 1999.
J. R. Koza, Genetic Programming II, Automatic Discovery of Reusable Subprograms. MIT Press, Cambridge, MA, 1992.
M. F. Brameier and W. Banzhaf, Linear genetic programming. Springer Science & Business Media, 2007.
S. Silva and J. Almeida, "Gplab-a genetic programming toolbox for matlab," in Pro- ceedings of the Nordic MATLAB conference. Citeseer, 2003, pp. 273-278.
M. Schmidt and H. Lipson, "Distilling free-form natural laws from experimental data," science, vol. 324, No. 5923, pp. 81-85, 2009.
P. J. Angeline, "Subtree crossover: Building block engine or macromutation," Genetic programming, vol. 97, pp. 9-17, 1997.
E. Analytics. (2018) Datamodeler : by evolved analytics. [Online]. Available: http://www.evolved-analytics.com/?q=about.
M. Kuhn and K. Johnson, Applied predictive modeling. Springer, 2013, vol. 26.
K. Deb, A. Pratap, S. Agarwal, and T. Meyarivan, "A fast and elitist multiobjective genetic algorithm: Nsga-ii," Evolutionary Computation, IEEE Transactions on, vol. 6, No. 2, pp. 182-197, 2002.
S. Bleuler, J. Bader, and E. Zitzler, "Reducing bloat in gp with multiple objectives," in Multiobjective Problem Solving from Nature. Springer, 2008, pp. 177-200.
B.-T. Zhang and H. Muhlenbein, "Balancing accuracy and parsimony in genetic programming," Evolutionary Computation, vol. 3, No. 1, pp. 17-38, 1995.
D. Searson, M. Willis, and G. Montague, "Co-evolution of nonlinear pls model components," Journal of Chemometrics: A Journal of the Chemometrics Society, vol. 21, No. 12, pp. 592-603, 2007.
J. Doe. (2014) Height, depth and level of a tree. [Online]. Available: http://typeocaml.com/2014/11/26/height-depth-and-level-of-a-tree/.
J. Neter, M. H. Kutner, C. J. Nachtsheim, and W.Wasserman, Applied linear statistical models. Irwin Chicago, 1996, vol. 4.
K. Deb and S. Gupta, "Understanding knee points in bicriteria problems and their implications as preferred solution principles," Engineering optimization, vol. 43, No. 11, pp. 1175-1204, 2011.

B. R. Munson, T. H. Okiishi, A. P. Rothmayer, and W. W. Huebsch, Fundamentals of uid mechanics. John Wiley & Sons, 2014.
J. E. Shigley, C. R. Mischke, and R. G. Budynas, Mechanical Engineering Design, International. Mc-Graw Hill Book Co., Singapore, 1989.
D. Chakraborty, S. Soni, J. Wei, N. Kovvali, A. Papandreou-Suppappola, D. Cochran, and A. Chattopadhyay, "Physics based modeling for time-frequency damage classication," in Modeling, Signal Processing, and Control for Smart Structures 2008, vol. 6926. International Society for Optics and Photonics, 2008, p. 69260M.
J. Branke, K. Deb, H. Dierolf, and M. Osswald, "Finding knees in multi-objective optimization," in International conference on parallel problem solving from nature. Springer, 2004, pp. 722-731.
G. Strang, G. Strang, G. Strang, and G. Strang, Introduction to linear algebra. Wellesley-Cambridge Press Wellesley, MA, 1993, vol. 3.
G. Casella and R. L. Berger, Statistical inference. Duxbury Pacic Grove, CA, 2002, vol. 2.
N. V. Chawla, K. W. Bowyer, L. O. Hall, and W. P. Kegelmeyer, "Smote: synthetic minority over-sampling technique," Journal of articial intelligence research, vol. 16, pp. 321-357, 2002.
H. He, Y. Bai, E. A. Garcia, and S. Li, "Adasyn: Adaptive synthetic sampling approach for imbalanced learning," in Neural Networks, 2008. IJCNN 2008.(IEEE World Congress on Computational Intelligence). IEEE International Joint Conference on. IEEE, 2008, pp. 1322-1328.
E. Zitzler, K. Deb, and L. Thiele, "Comparison of multiobjective evolutionary algorithms: Empirical results," Evolutionary computation, vol. 8, No. 2, pp. 173-195, 2000.
F. Wilcoxon, "Individual comparisons by ranking methods," Biometrics bulletin, vol. 1, No. 6, pp. 80-83, 1945.
K. Miettinen, Nonlinear multiobjective optimization. Springer Science & Business Media, 2012, vol. 12.
R. Q. Sardinas, M. R. Santana, and E. A. Brindis, "Genetic algorithm-based multiobjective optimization of cutting parameters in turning processes," Engineering Applications of Artificial Intelligence, vol. 19, No. 2, pp. 127-133, 2006.
W. H. Press, S. A. Teukolsky, W. T. Vetterling, and B. P. Flannery, "Golden section search in one dimension," Numerical Recipes in C: The Art of Scientific Computing, p. 2, 1992.
F. Doshi-Velez and B. Kim, "Towards a rigorous science of interpretable machine learning," arXiv preprint arXiv:1702.08608, 2017.
T. Hastie, R. Tibshirani, and J. Friedman, "The elements of statistical learning: data mining, inference, and prediction, springer series in statistics," 2009.

* cited by examiner

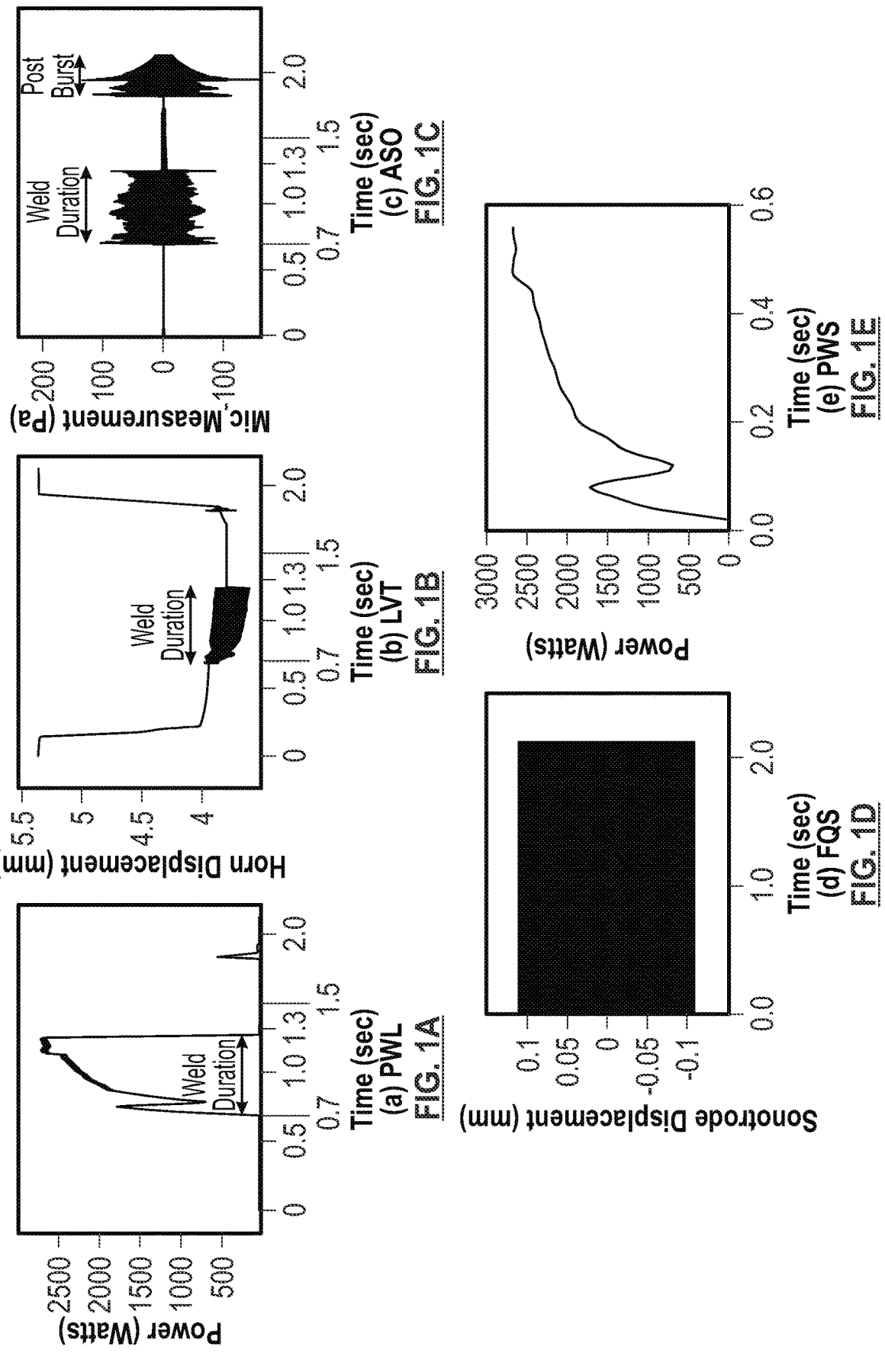

$$-x_1^2 + 2.02\,x_1x_2 - 3.05x_2^2 + 1.98 = 0$$

SYSTEM AND METHOD FOR CONTROLLING A MACHINE USING DIMENSIONALLY AWARE RULE EXTRACTION

CROSS-REFERENCE TO RELATED APPLICATIONS

This application is a continuation-in-part of U.S. patent application Ser. No. 17/194,534 filed on Mar. 8, 2021, which claims the benefit of U.S. Provisional Application No. 62/987,142, filed on Mar. 9, 2020. The entire disclosures of each of the above applications are incorporated herein by reference.

FIELD

The present disclosure relates to machine learning and, more specifically, to rule generation for classifying good quality products from bad quality products based on database variables available in process monitoring data.

BACKGROUND

There presently is no non-destructive test method that can confirm weld quality in ultrasonic welding of sheet metals. In the past, confirming weld quality has included tedious feature identification and building black-box classifiers to ascertain quality from process monitoring data. This manufacturing process is so sensitive to environmental variables such as, the sonotrode of a welding machine, ambient temperature and, humidity, tool wear etc., that every minor change in any of these requires the entire exercise from identifying important features to building a black-box classifier to be repeated manually. Furthermore, the black-box classifiers do not yield themselves to understanding the physics of this process which can be immensely helpful in building controllers for the welding process.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes at least one processor and a memory coupled to the at least one processor. The memory stores a dimensionally aware model generated based on a training set and guided by feature dimensions and instructions for execution by at least one processor. The instructions include, in response to receiving a set of data from a user device, identifying a set of features from the set of data and applying the dimensionally aware model to the set of features by implementing a boundary representation. The instructions include classifying the set of features as acceptable in response to the implementation of the boundary representation indicating the set of features are outside the boundary representation, classifying the set of features as unacceptable in response to the implementation of the boundary representation indicating the set of features are inside the boundary representation, and generating, for display on the user device, an alert based on the classification. Furthermore, this boundary representation is used in obtaining a sub-optimal controller to affect the welding machine parameters that produce acceptable quality welds.

In a continuous manufacturing process, such as ultrasonic welding, the overall quality of the process depends on machining quality at every time step and their coordination with the past and future steps. Such a manufacturing process needs to be analyzed and monitored at every time step to look for signature properties of measurable features denoting the quality of the product until the current time step to decide whether the manufacturing process must be continued to its completion or should be rejected due to aberrations already observed. Machine learning methods are typically employed from existing data of a manufacturing process to bring out acceptable signatures.

Although machine learning methods can learn the hidden rules associating features of time series data, the derived rules are often meaningless and often do not even conform to a dimensionally correct rule. In this work, a dimensionally aware rule mining approach has been developed based on genetic programming and recently developed automated rule discovery methods to decipher rules that have a physical meaning. In addition to finding a suitable classifier for evaluating whether a manufactured product is a 'pass'. Another motivation for our study is to come up with a better physical and scientific insight to the complex manufacturing process from the derived, dimensionally aware, and meaningful rules. These rules are composed of features that are extracted from welding machine sensor data in an analytical form and help with designing appropriate controller for a welding machine to produce an acceptable product.

The present disclosure develops a data classification technology that receives raw manufacturing time series data for a physical process as input and provides the user with dimensionally meaningful rules involving process features which discriminate good ('acceptable') and bad ('un-acceptable') cases. Any classification task is preceded by "feature creation" and "feature selection" tasks that are traditionally performed manually by domain experts.

The present new classification technology uses features created using basic mathematical operations such as addition, division, multiplication, subtraction of scalars and mathematical functions such as differentiation, integration, and Fourier transform from time series of supplied manufacturing data and proposes a bi-objective optimization-based machine learning approach to automatically deduce meaningful rules. This method is able to find simple-structured rules involving only a few features (two to four), thereby allowing engineers to isolate and comprehend a few critical features and their relationships for classifying good manufacturing processes from bad ones. Furthermore, the evolved rules are adapted to be dimensionally correct as much as possible by using problem constants, so that the rules are physically meaningful. The overall procedure is generic and ready to be applied to other similar manufacturing problems.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIGS. 1A-1E are graphs of example time series data collected for a production event.

In the drawings, reference numbers may be reused to identify similar and/or identical elements.

DETAILED DESCRIPTION

Figure 2A:
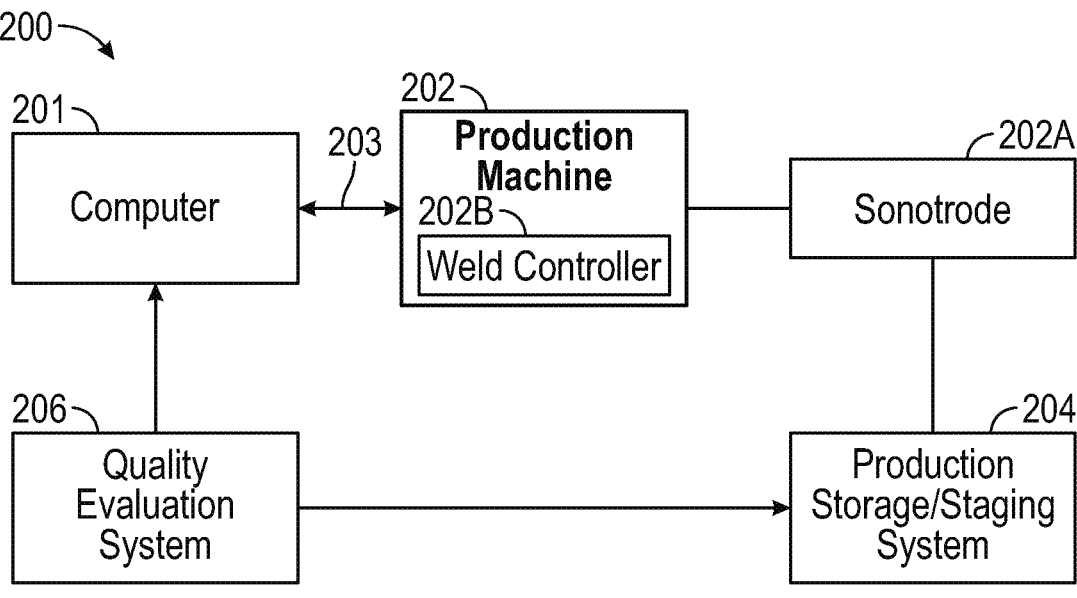
FIG. 2A is a block diagrammatic view of a computer and a production machine as separate systems.

To classify whether a production event resulted in an acceptable or unacceptable product, a dimensionally aware rule extraction system generates a machine learning system to classify an individual production event based on an identified set of salient production features. For example, a set of training data for both good (acceptable) and bad (unacceptable) production items, such as a welded item, is used to create a machine learning model. The machine learning model is trained using time series production data, for example, from welding of the weld item. From the time series data, a machine learning model is generated using genetic programming to identify the set of salient features from the training data, which may be the base features or non-linear combination thereof and determine boundaries between the good and bad data using linear regression.

In various implementations, the machine learning model is trained and generates a set of decision boundaries in the form of mathematical expressions composed of base features or non-linear combination thereof. The method uses genetic programming based bi-objective population-based optimizer for learning the structure of constituent sub-expressions of these decision boundaries, which is followed by linear regression for learning the coefficients of these constituents. Each boundary representation or equation of the set of boundaries may have a different rate of error as well as a different complexity. To select one of the boundaries as a threshold equation, the dimensionally aware rule extraction system may identify which boundary includes an acceptable amount of error as well as an acceptable amount of complexity. In various implementations, the dimensionally aware rule extraction system may output the set of boundaries for a user to select, which the machine learning model then implements to classify incoming data.

The machine learning method generates a set of Pareto optimal or PO classifiers followed by automatically selecting one of the PO solution from the knee region of the trade-off set. An additional element of the dimensionally aware rule extraction system is the dimensional awareness.

When generating the machine learning model and analyzing the time series data, the machine learning model can provide additional user preference on acceptable dimensional inconsistency. An example of dimensionally inconsistent expression is one in which a feature having the units of distance (for example) is added to another feature having the dimensions of power. If the user prefers solutions with no dimensional inconsistency, then the machine learning model can be used to either filter out such solutions from the set of trade-off classifiers or use this metric to promote solutions with lower dimensional inconsistency during optimization. This results in the generation of boundaries that make practical sense and can be adjusted or implemented during production of the weld item to increase the likelihood that the weld item is good. Furthermore, such dimensionally consistent rules lend themselves to physical understanding of the system as well.

The user may also decide to use the rule generation in tandem with dimensional consistency check so that the dimensionally consistent rules can be preferred and promoted during the optimization process and not just at the end of it.

The dimensionally aware rule extraction system is designed to develop a computationally efficient machine learning methodology for extracting classification rules from time series data involving a routine manufacturing application. For example, as lowering of battery costs is driving the sales and projections of electric vehicles up, so has the research interest in understanding the underlying physics of core manufacturing processes involved in manufacturing Lithium-Ion batteries.

This system aims at learning interpretable and meaningful classification rules relating features of time series data of a manufacturing process so that the rules can be used to determine the quality of the product manufactured. The term "interpretable-rules" in the context of this system refers to rules in the form of mathematical expressions/equations involving the process features, process constants, and some simple operations such as addition, subtraction, multiplication, and division. The term "meaningful-rules" in the context of this system refers to the idea of aforementioned expressions being physically meaningful by being dimensionally consistent.

In the machine learning literature, classifiers that are most accurate are also least interpretable. Linear classifiers, such as Linear Support Vector Machines, lie at one end of the spectrum of classifiers that are easy to interpret but have poor performance on realistic complex data. On the other hand, something like Deep Neural Networks perform very well on complex data yet are very hard to interpret by humans.

In various implementations, the system interprets and classifies weld quality. For each weld produced, particular time series data is obtained. For example, the following time series sensor data can be available for an ultrasonic welding event: (i) power consumed by the ultrasonic transducer in Watts, (ii) sonotrode tip displacement along the direction of clamping force in mm, and (iii) acoustic data from a fixed ultrasonic microphone in Pascals. Such time series data is shown in FIGS. 1A-1E.

The three aforementioned data can be recorded at a sampling rate of 100,000 samples per second. In an example system, a constant stream of weld data is forwarded to a classifier that can successfully classify the Go/NoGo (e.g., good/not good) classes with zero false positives (type-II error). The inputs to the classifier include power data, acoustic data, sonotrode tip movement data, and noise respectively.

Furthermore, once the classifier is performing "reasonably" well, characterized by a suspect rate for the current batch K of welds below a user defined value α, another machine learning method learns dimensionally consistent rules that exist in the Go welds and not in NoGo welds or vice versa. This classifier is also known as Dimensionally Aware Genetic Programming or "DAGP."

In this system, four tasks are of interest. Task-1 pertains to generation of features and task-2 pertains to feature selection and classifier identification. Task-3 pertains to providing the user additional information about classifier in regard to its adherence to the law of dimensional homogeneity. Task-4 pertains to designing and obtaining a sub-optimal controller to allow the machine to react to changes in weld quality by adjusting the parameters of welding machine.

In traditional machine learning methods, once the data is cleaned, the first task is to create a set of features. Most of the time, domain knowledge is used to create these features from cleaned data. However, manually coming up with features is difficult and time consuming. In the present disclosure, Genetic Programming or GP is used to create features from cleaned time series data using some basic mathematical constructs, such as addition, subtraction, differentiation, integration, etc.

Once a set of features has been generated, the next task in any classifier building process is to first identify a small subset of features deemed most fit to yield high classification accuracy. This step is known as feature selection. Subsequently, building a classifier from this small subset of "high performing" features entails optimizing the parameters of some classifier model, given this feature set. The feature selection and optimizing of a classification model is inherently a Bi-level optimization problem, with feature subset selection being a higher level decision and classifier building being a lower level decision. However, to reduce the complexity of this problem, a small feature subset is first selected using manual methods, such a principal component analysis (PCA), univariate selection, correlation matrix with heat map, and even genetic algorithms. Then, optimization of the parameters of the classification model is performed using such a set of features. A GP is implemented in the dimensionally aware classification system to achieve automated feature generation, feature engineering, feature selection, selection of classification model, and then optimization of parameters of classification model, all in one algorithm.

Preferring dimensional consistent information (data) is a task unique to the classifier. It will also provide the user with additional information about how well some classification rules adhere to the law of dimensional homogeneity. If two rules have similar classification accuracy, then the rule that is dimensionally consistent can be chosen by the user. Furthermore, a rule which is not only accurate in classification accuracy but also dimensionally consistent, is a prime candidate for understanding the science of the underlying process producing the date. In our case, this data is the ultrasonic welding (USW) process. The motivation for such a strategy is to have a better physical insight into the complex manufacturing process from the derived, dimensionally aware and meaningful rules.

GPs have been known to be excellent for non-linear symbolic regression and a number of commercial software that are based on the same. However, knowledge discovery discovers symbolic regression in that the model shall not only fit the data well but also be plausible and human interpretable. The key to inducing such knowledge is to incorporate semantic content and heuristics encapsulating the human interpretability and plausibility aspect into the search process. In this system, dimensional consistency is chosen to be a guiding principle in discovering rules that not only have low error of fit on data but are also dimensionally consistent.

The strategy of the DAGP is learning the structure and weights of a rule separately, which has shown to be a good strategy. The DAGP breaks the problem of learning rules into two parts: (i) learning the structure and (ii) learning the weights. It uses a GP for finding the optimal structure of a rule and some classical methods, Ordinary Least Squares, OLS regression in symbolic regression task and linear Support Vector Machine, SVM in binary classification task, for learning the weights in a rule. Furthermore, DAGP solves a bi-objective problem to effectively control bloating which is a very common problem encountered with single objective GP algorithms. For classification problems with highly biased class data, it is important to produce synthetic data using algorithms such as Adaptive Synthetic (ADASYN) so that classification algorithms can perform satisfactorily.

Figure 3:
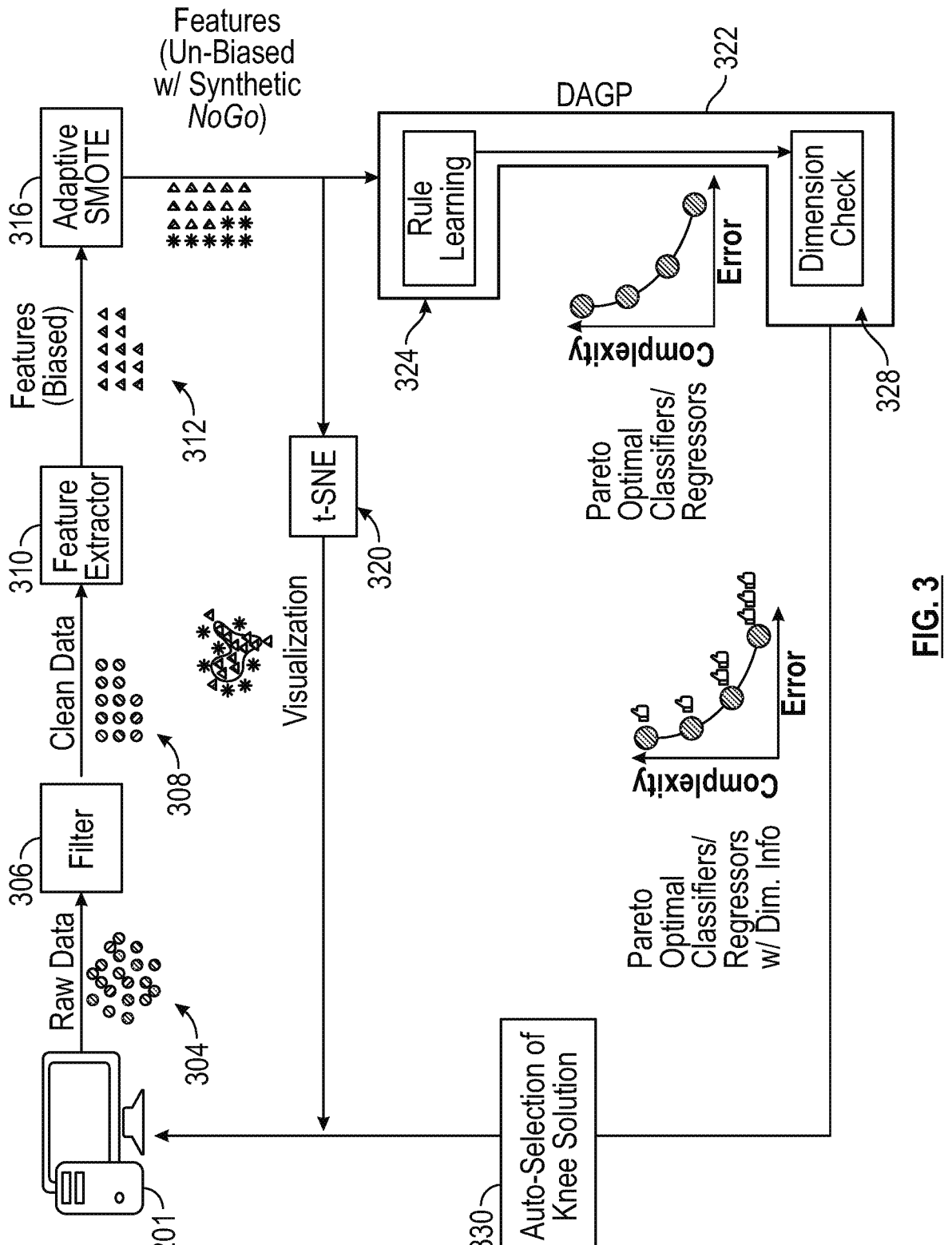
FIG. 3 is an example implementation of a dimensionally aware machine learning model generation system.

The classification data, including synthetic minority class data, is used in visualization algorithms such as t-SNE to get some qualitative learnings about the data, as described in FIG. 3. Once DAGP has performed the rule learning task for symbolic regression or classifier learning task for binary classification problem, DAGP can go a step further to ascertain if the PO solutions being returned by DAGP adhere to the law of dimensional homogeneity or not, and if not then what is the degree of dimensional mismatch that exists in a solution. The user can also decide to allow this data to be used during the rule search; however, this capability comes at the cost of computational cost as this entails many symbolic algebra calculations. Once a set of PO solutions is obtained, only one is automatically selected from the knee region of the trade-off set. This helps with selecting a classifier that is just the right trade-off between classification accuracy and rule complexity.

Now referring to FIGS. 1A-1E, graphs of example time series data collected for a production event are shown. The time series data is raw data and is referred to the sensor data recorded for each weld. There are five time series that are recorded for each weld namely: PWL data, shown in FIG. 1A, LVT data shown in FIG. 1B, ASO data shown in FIG. 1C, FQS data shown in FIG. 1D, and PWS data shown in FIG. 1E. PWL data is a time series that captures the power supplied to the weld by a sonotrode at a sampling rate of 100 kHz. FIG. 1A shows an example of a PWL time series for a weld. The recorded sensor values are already calibrated.

LVT data is a time series that captures the movement of the sonotrode tip orthogonal to the direction of sonotrode vibration by a linear variable differential transformer sensor. It is recorded at a sampling rate of 100 kHz. FIG. 1B shows an example of a LVT time series for a weld. The recorded sensor values are not calibrated and need calibration data for each weld separately.

ASO data is a time series that captures the sound data during a weld using a highly sensitive microphone (mic) with an audio range of 20 Hz to 40 kHz. It is recorded at a sampling rate of 100 kHz. FIG. 1C shows an example of an ASO time series for a weld. The recorded sensor values are already calibrated.

FQS data is a time series that captures the vibratory movement of a sonotrode tip. The parent sensor of this data is provided by the manufacturer of welding equipment. Every sonotrode has a slightly different resonance frequency in the ballpark of 20 kHz. Hence, this time series is nothing but a sinusoid of constant frequency for entire duration of a weld. This data may be used for detecting a change in the tool. It is recorded at a sampling rate of 100 kHz. FIG. 1D shows an example of the FQS data time series. It does not appear to be a sinusoid because of the high frequency of sampling the sinusoid.

PWS data is a time series that can be obtained from PWL data by taking data corresponding to the duration of the weld and then down sampling it to 100 Hz. An example of this time series is shown in FIG. 1E.

Referring to FIG. 2A, a functional block diagram of a dimensionally aware rule extraction system 200 is implemented in a computer 201. The computer is microprocessor based and is programmed to perform various functions. The dimensionally aware rule extraction system 200 receives production data from a production machine 202 to determine whether the production data, which is time series data from the creation of an item, indicates that the created item is acceptable or unacceptable.

The production machine 202 is in communication with the computer 201 through a communication link 203 such as a wired network, wireless network, optical fiber or hard wire. The production machine 202 in this example controls a tool 202A such as a sonotrode for ultrasonic welding. The production machine 202 has a machine controller such as a weld controller 202B, in this example. The weld controller 202B operates the tool 202A using machine parameters that are communicated thereto. Carrying forward the example of an ultrasonic welding production machine, the machine parameters may be, but are not limited to, weld duration, clamping force and sonotrode amplitude. The output of the machine 202 is production data such as production time series data that may be communicated from the production machine 202 to the computer 201 during operation. The computer 201 may automatically adjust the machine parameter to adjusted machine parameters based on the production data as described in further detail below. Ultimately, the adjusted machine parameters are communicated from the computer to the machine controller 202B through the communication link 203.

The system 200 may also include a production staging and storage system 204. The production staging and storage system 204 may provide the parts to the production machine in an automated manner. Parts acted on by the production machine 202 may also be received at the production staging and storage system 204. Items formed by the machine 202 that are not in conformance with production guidelines may be returned to the production storage and staging area where they are discarded and/or further studied by a quality evaluation system 206. The further study may be generating measurements and performing testing including destructive testing.

Figure 2B:
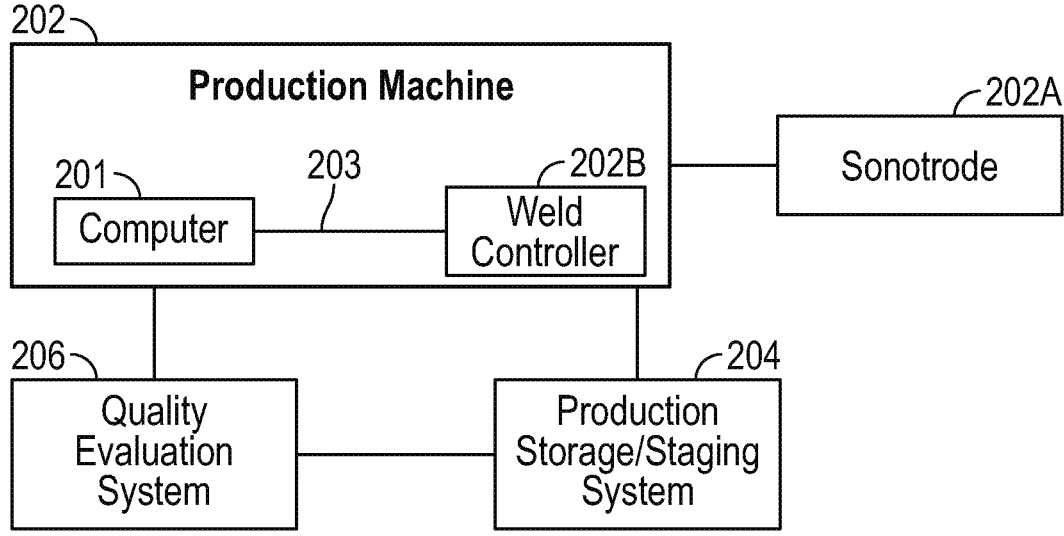
FIG. 2B is a block diagrammatic view of the computer incorporated into the machine.

Referring now to FIG. 2B, the computer 201 may be incorporated into the production machine 202 as well. An external link is therefore not required. The link may be internal and may include a wired or wireless connection. Updated machine parameters may therefore be communicated to the machine controller 202B within the machine 202. The production staging and storage system 204 and quality evaluation system 206 may be coupled to the production machine 202 of FIG. 2B as well.

Figure 2C:
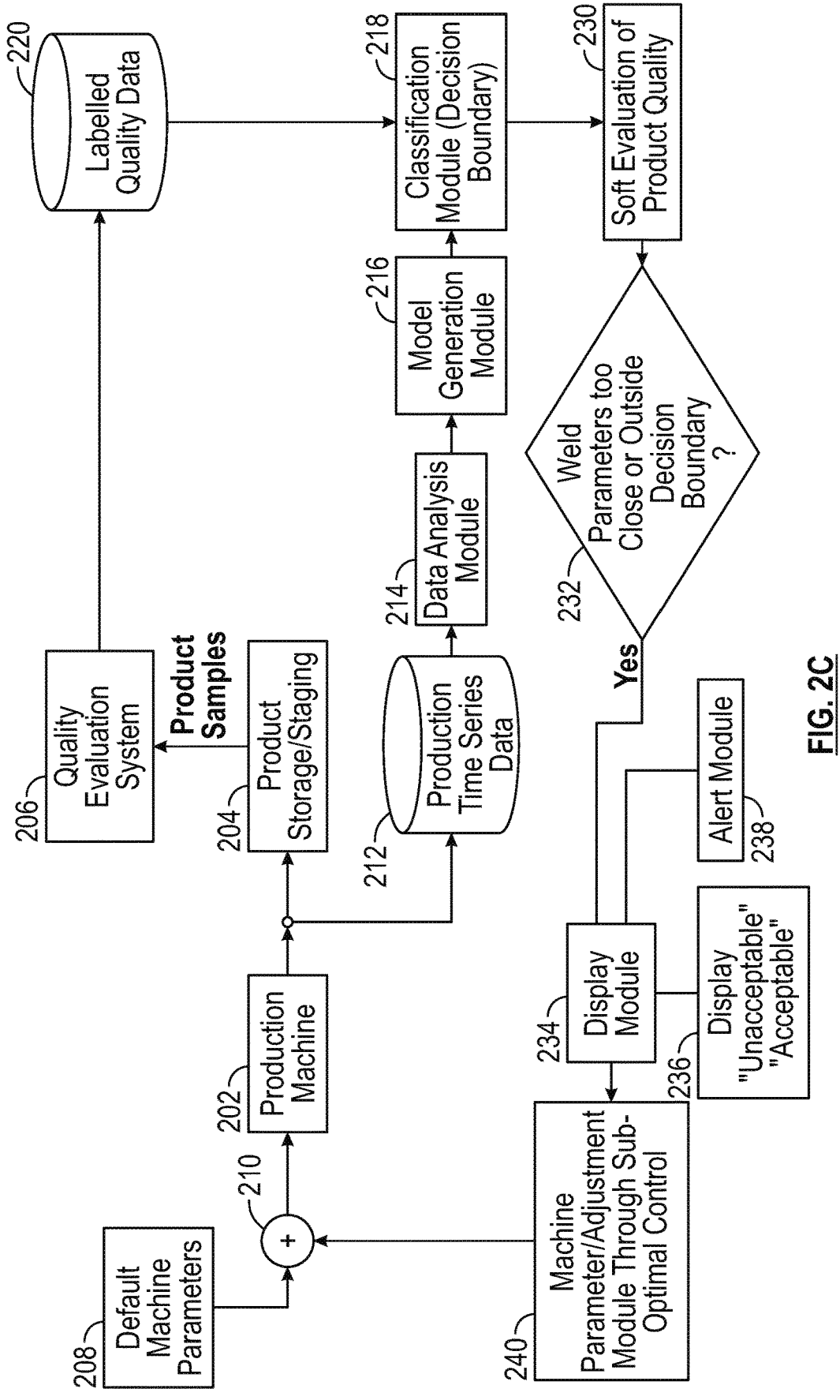
FIG. 2C is a functional block diagram of a dimensionally aware rule extraction system.

Referring now to FIG. 2C, a functional block diagram of the operation of the system 200 is set forth. The system may begin operation with default machine parameters 208. That are provided to an adjustment block 210 that allows for the adjustment of the default machine parameters as described below. The default parameters are used to operate the production machine 202. Production data is stored in a production time-series database 212 so that an updated machine learning module can be developed using all production data. A data analysis module 214 receives the production data for analysis and cleaning. In various implementations, the data analysis module 21 may have known features to identify in the production data or certain time series data to filter, clean, and/or transform for classification by a classification module 218, that acts as a decision boundary system. In the present ultrasonic welding process time series data may include but are not limited to (i) power consumed by the ultrasonic transducer in Watts, (ii) sonotrode tip and horn displacement along the direction of clamping force in mm, and (iii) acoustic data from a fixed ultrasonic microphone in Pascals, (iv) clamping force in Newton. In the present example, a model generation module 216 may receive the data prior to the classification module 218 and used to develop a model for controlling the controller 202B of the production machine.

The classification module 218 classifies the production data based on a machine learning model generated by the model generation module 216. As described above, the classification module 218 may calculate where the production data is classified based on the boundary representation described by an equation that includes variables that represent particular features of the production data. In various implementations, a labelled quality data database that includes salient features. In this way, the data analysis module 214 can extract the salient features of the production data. Additionally or alternatively, the model generation module 216 can directly instruct the data analysis module 214 which features are relevant to the presently implemented machine learning model version.

As shown in the dimensionally aware rule extraction system 200, each machine learning model generated by the model generation module 216 can store which features are salient to that particular model in the database 220.

The classification module 214 may also be in communication with a soft evaluation module 230. The soft evaluation module determines the product quality parameters to be evaluated based on the classification module 218. A comparison module 232 determines whether the production data is too close to or outside the decision boundary.

In various implementations, a display module 234 may be incorporated into the computer 201 that has a display 236 implemented by a processor with a memory. The display 236 may be used to generate alerts or messages corresponding to whether the data is acceptable or unacceptable based on the output of the comparison module 232 as will be described in more detail below. Then, the user or the computer can then relate the salient features to the production process. For example, if the time to weld is particularly relevant and a main feature included in a boundary representation equation, once the user is in possession of this information (including the boundary representation equation), the production process may be automatically adjusted in a machine parameter adjustment module 240 as needed to increase the likelihood that a particular weld event will result in an acceptable weld.

Once the comparison module 232 compares the location of the production data with respect to the boundary equation, the comparison module 232 forwards an indicator to the display module 234 whether the production data indicates that the corresponding production event was "acceptable" or "unacceptable" with an indicator that illustrated in the display 236. An alert module 238 may generate an alert (visual, haptic, audible) indicating when the production data indicates that the corresponding production event is unacceptable. Then, the alert condition may also forwarded to the display 236 for display to a user, for example, if the alert is visual, such as through the indicator on the display 236. In various implementations, the display module 234 also displays an indication when the production event was acceptable. Additionally, in example implementations, the production data may only be stored in the production time-series database 212 when the production data is classified as acceptable.

The machine parameter adjustment module 240 may adjust the operating parameters of the production machine by communicating the updated parameters to the adjustment block 210. The production machine 202 is then operated with the adjusted parameters.

As mentioned briefly above, certain parts may be further studied after being communicated to the product storage and staging system 204. The quality evaluation system 206 may be an automated process or a manual process for evaluating the processes items. Destructive testing and measurements associated therewith, and other measurements of a malformed item may be collected. The measurements may be used to ultimately determine whether data is acceptable and stored as labelled quality data in the labelled quality database. The labeled quality data database 220 is used to update the learned decision boundary in module 218 and may be used to adjust machine parameters at the machine parameter adjustment module 240 via a sub-optimal controller.

FIG. 3 is an example implementation of a dimensionally aware machine learning model generation system and shows various components of DAGP. First, the raw data 304 is filtered in a filter 306 to filter (remove) anomalous data such as repeated values of weld qualities or unreadable data files etc. Then, features are extracted from this clean data 308 in a feature extractor 310. Since the weld data is highly biased with the NoGo data being a very small proportion of the overall data, synthetic data is generated for the NoGo class (unacceptable) to aid the subsequent classification task. This unbiased feature data 312 may implement an adaptive Synthetic Minority Oversampling Technique (SMOTE) 316 to oversample the minority class. This unbiased feature data 312 can then be visualized in a two- or three-dimensional space using an t-SNE 320 (Distributed Stochastic Neighbor Embedding) algorithm. Such a visualization can offer valuable qualitative information about the data being classified. The unbiased feature set for the two classes can also be fed to DAGP to obtain a Pareto optimal (PO) set of classifiers with additional information on their adherence to the law of dimensional homogeneity. Although a decision maker can subsequently make a choice from these classifiers, however a solution from the knee region of the trade-off set of a plurality of classifiers is automatically selected by default and implemented at the welding station. Note that if DAGP is to be used for a symbolic regression task then one needs to provide regressand and regressor data for the same class.

Each weld had a unique ID referred to as Weld ID (WID). For each weld, two kinds of data are obtained: (a) weld inspection quality values and (b) raw time series data. The inspection quality data carried information on whether a weld belonged to the Go class or the NoGo class. The raw data obtained for each weld is shown and described with respect to FIGS. 1A-1E.

Before extracting features from the weld data, first the location of the weld is identified in the time series corresponding to the welding process. For example, as shown in FIG. 1A, the welding is performed between 0.7 seconds to 1.3 seconds from the start of the process. Once the location of weld in the time series is captured, different metrics of interest (features) for a weld are calculated from the time series data.

Figure 6:
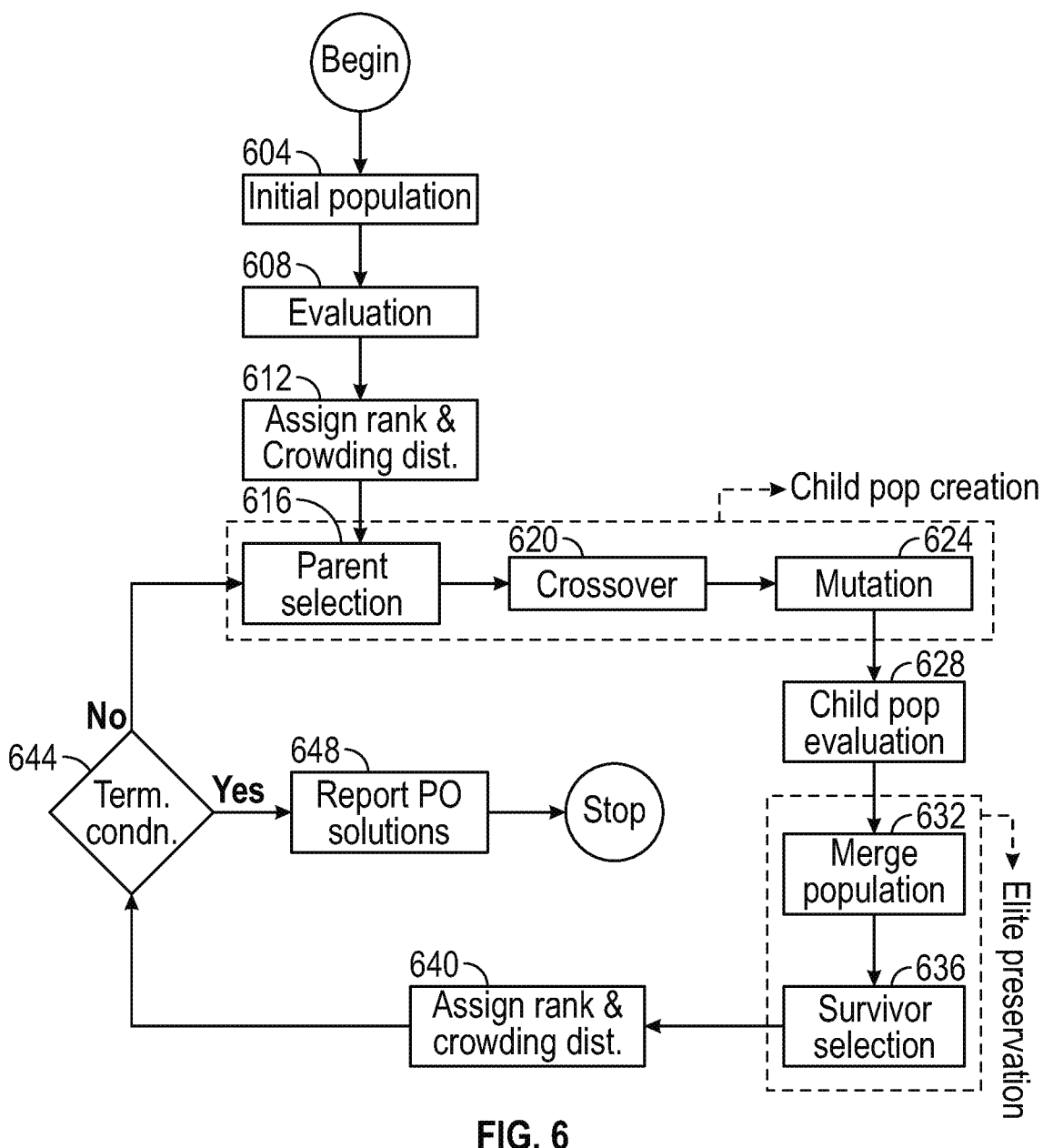
FIG. 6 is a flowchart depicting an example implementation of a dimensionally aware machine learning model system generation.

The DAGP 322 then learns rules at rule learning module 324, which is described in detail in FIG. 6. Although, the rule learning part of DAGP can learn rules that accurately fit the data, if any rule adds or subtracts two incommensurable quantities, then such a rule is physically meaningless. Therefore, a dimension check module 328 is performed quantifying the degree of dimensional mismatch in a rule found by the DAGP. Such a quantification of dimensional mismatch for the PO rules found by rule learning part of DAGP can give the user additional information if the user needs to choose only one or very few solutions out of the PO set. In a nutshell, this is the purpose of the dimension check module 328.

The user may also decide to use modules 324 and 328 in tandem so that the dimensionally consistent rules can be preferred and promoted during the optimization process and not just at the end of it.

To quantify dimensional mismatch penalty in a rule found by DAGP, for example, the rule learning part of DAGP may be used for solving a symbolic regression problem relating regressand (y) and regressors ($x_k$, $k \in \{1, 2, \ldots, n_x\}$), which yields a set of PO rules. An example PO rule is:

$$r \equiv y = w_0 + \sum_{i=1}^{n_t} w_i \cdot t_i$$

where $w_0$ is a bias term, $n_t$ is the total number of terms, $w_i$ is the regression coefficient for term $t_i$ and $t_i$ is some function of regressors $x_k$, $k \in \{1, 2, \ldots, n_x\}$.

Different classification methods generally offer a trade-off between classification accuracy and human interpretability. A practitioner has to choose in the early stages of a classification task what is more important to them. The best classification accuracy is typically achieved by black-box models such as neural networks, random forests, kernel based SVMs, or a complicated ensemble of all of these methods. On the other hand, models whose predictions are easy to interpret and communicate are usually very poor in their predictive capabilities, such as linear SVMs or a single decision tree.

The power of human interpretability of a model or classifier lies in the potential (of such a model) for knowledge discovery. Take the example of face recognition algorithms using deep learning (DL). If a deep learning model of face recognition can be human interpreted to discover that the relative linear proportions of eye-brows, nose, and lips over the face are the most important features based on which a facial recognition decision is made, then that is a great discovery.

In the context of classification of the ultrasonic weld data, any knowledge about: (i) what features are important in deciding the quality of a weld and (ii) how different features interact with each other to decide the quality of a weld, can be considered vital knowledge.

DAGP learns a rule of the form given by the above equation by letting GP optimize the structure of rules and letting some efficient classical method to optimize the corresponding weights in those rules. For a symbolic regression task, this classical method is OLS method of estimation. For the binary classification task, a linear SVM for this job is chosen. This is because the results of linear SVM are considered very interpretable. The challenge lies in finding the right number of higher dimensions and the right features/derived-features corresponding to those dimensions in which the data is linearly separable. In such a space, a linear SVM will be able to find an appropriate separation plane with relative ease, provided that the decision boundary is not discontinuous. Derived features are features that are composed from the initial set of hand-crafted features using basic operations such as addition, subtraction, multiplication, and division.

Figure 5:
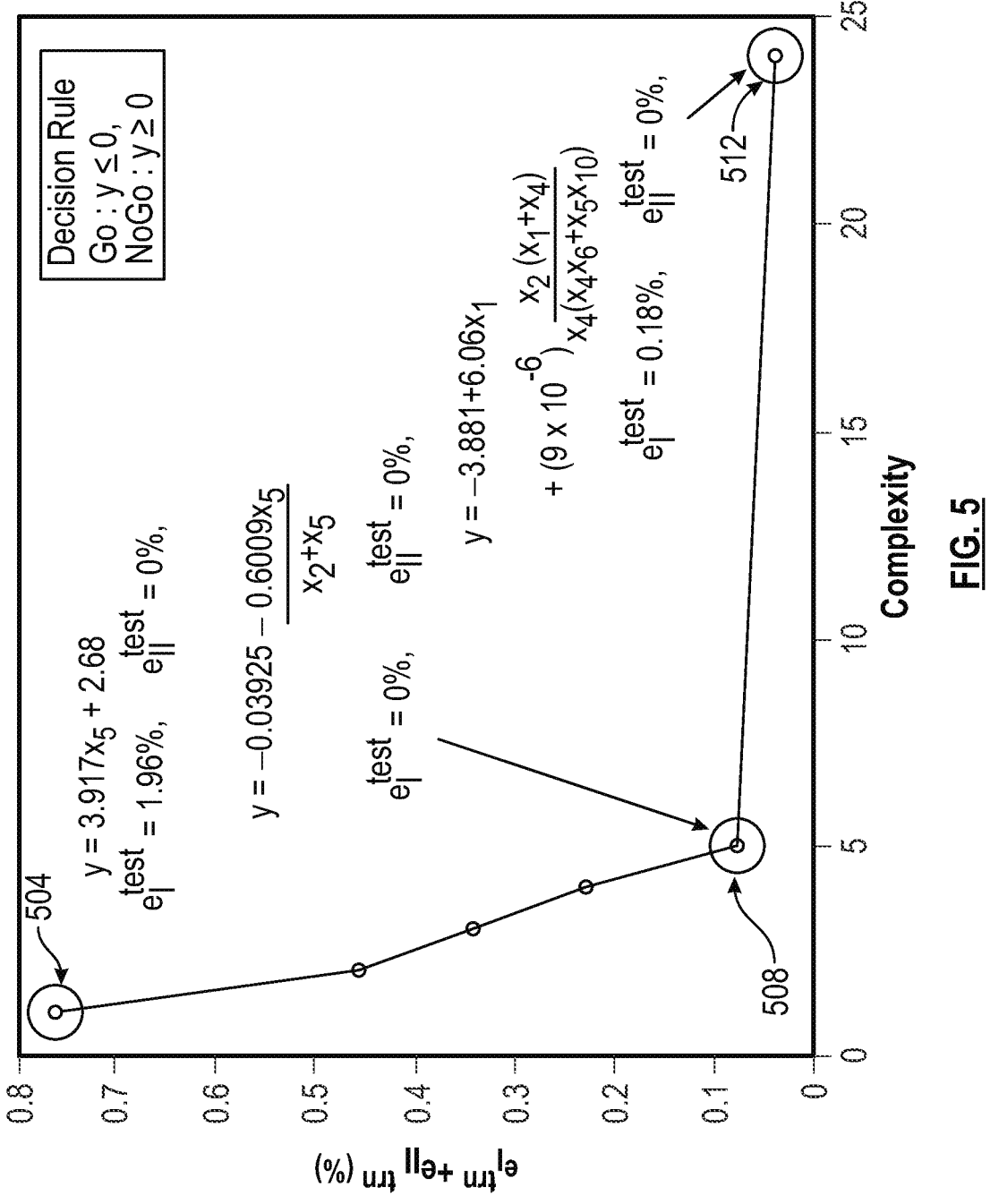
FIG. 5 is a graphical depiction of extracted rules defined by complexity and error.

Once the dimension check is performed, the solution may be determined based on an auto-selection of the knee solution or region. An example of a knee-solution is illustrated in FIG. 5. The knee solution may be automatically selected and therefore the machine operating parameters that go therewith are used to operate the machine.

Figure 4:
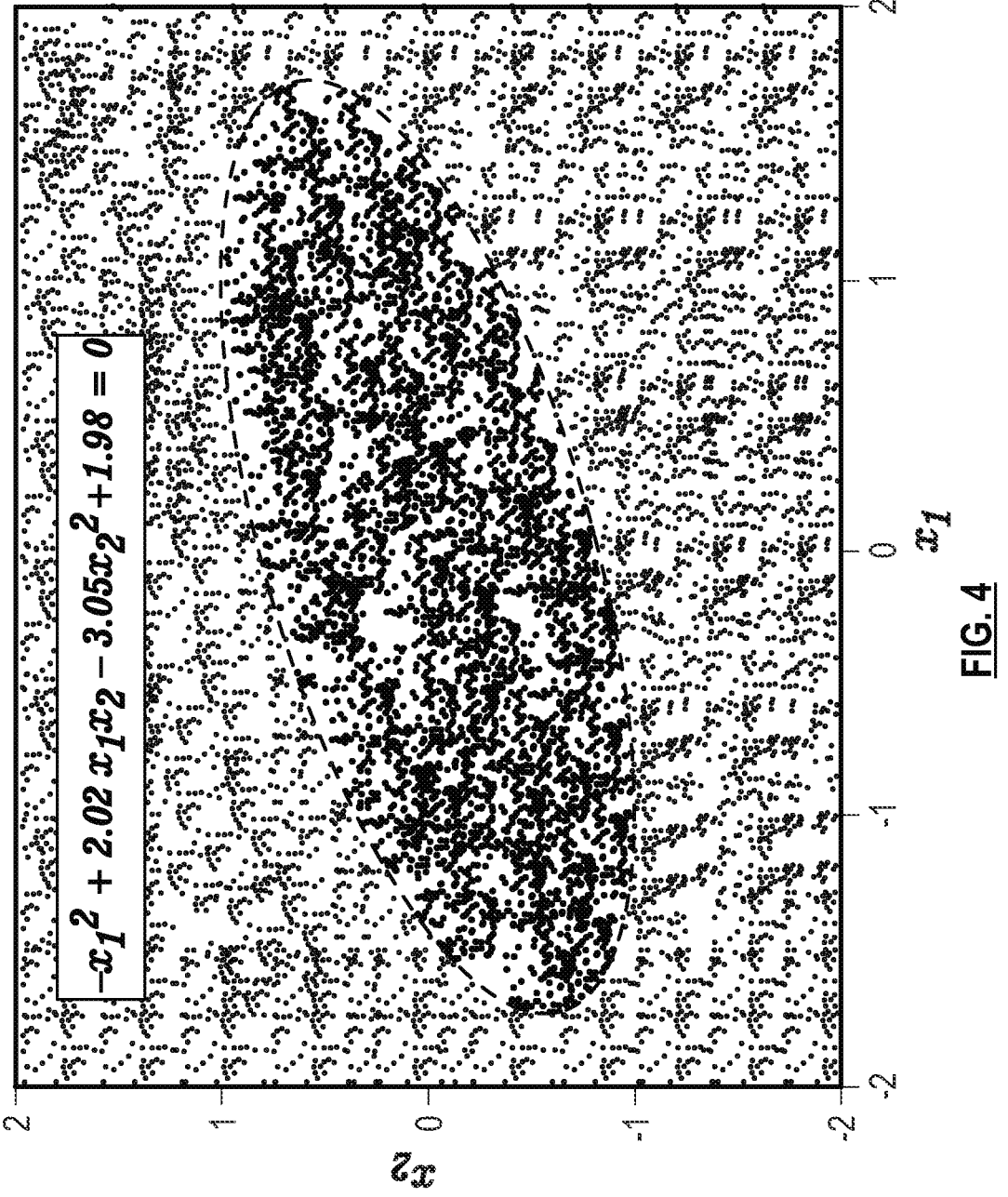
FIG. 4 is a graphical depiction of a boundary representation equation for classifying features of sample two class data.

Referring now to FIG. 4, a graphical depiction of a boundary equation for classifying features of sample binary data is shown. The binary data shown in FIG. 4 is generated using the following equation of an ellipse:

$$y = -x_1^2 + 2.02x_1 \cdot x_2 - 3.05x_2^2 + 1.98 = 0$$

where x_1 and x_2 are the two features for this data. The data of hypothetical Go class (y<0) is shown in green gray and the data of hypothetical NoGo class (y≥0) is shown. Clearly, the above equation for FIG. 4 defines the decision boundary for this problem. What is interesting to note is that if only the features x_1 and x_2 are provided to a linear SVM algorithm, it will perform very poorly as the data is not linearly separable. Now consider the following three features, namely $$x_1^2, x_2^2,$$

and $x_1 \cdot x_2$. These three features are called derived features as they were not provided with the original features of the problem but are derived from the same. Now, if these three features are provided to a linear SVM algorithm, it will perform exceedingly well on the same data. The reason being that in this modified 3-dimensional feature space, the data is linearly separable. Working with a derived feature space has the advantage of keeping the classifier more interpretable and not obfuscating the derived features by performing complex operations on the original feature space.

Figure 8:
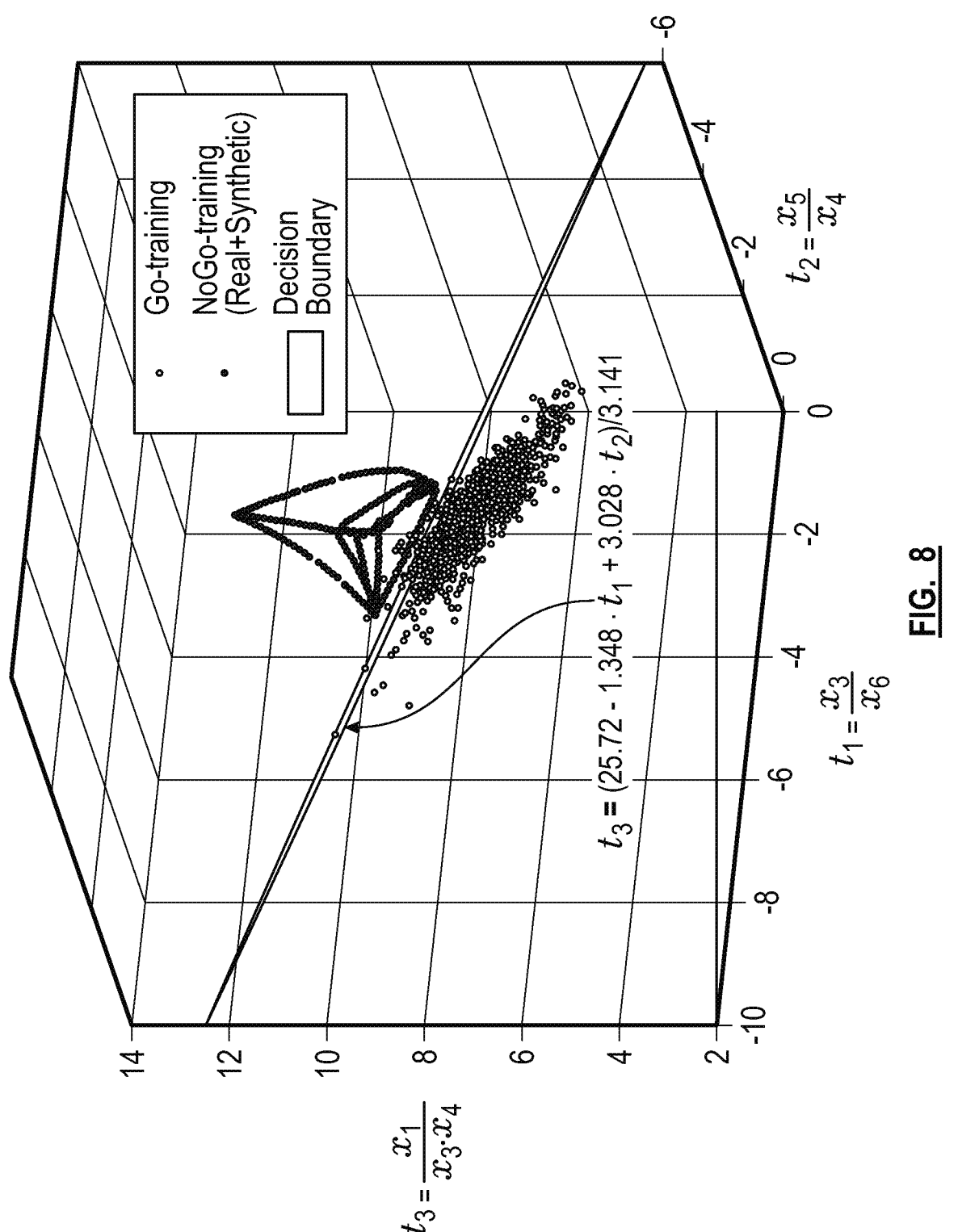
FIG. 8 is a graphical depiction of a boundary representation equation for classifying features of sample two class data from an ultrasonic welding process.

Referring now to FIG. 8, a graphical depiction of a boundary equation for classifying features of actual production data is shown.

In a further example, consider a classification problem with $n_0$ observations, $n_x$ number of features ($x_i$, i∈ {1, 2, . . . , $n_x$}), and no binary class labels ($y_i$∈ {0, 1}, $\forall_i$∈ {1, 2, . . . , $n_0$}) initially provided with the problem. When solving a classification problem using DAGP, consider a DAGP individual with same rule structure as shown in the PO rule equation. The terms $t_i$ can be considered as derived features obtained by simple operations of {+, −, ×, ÷} on the original features. The weights of this individual are then learned using a linear SVM method and the misclassification error at the end of weight optimization by SVM is assigned as error fitness to the individual. The complexity fitness is calculated same as in case of the symbolic regression case, i.e., total number of tree nodes in the terms of rule corresponding to the DAGP individual.

Note that for the USW data, the cost of misclassifying NoGo should be much more than the cost of misclassifying Go weld data. For this reason, the cost matrix used by the linear SVM for arriving at the weights is kept so that the cost of making type-II error on the training set is set 25 times higher than cost of making a type-I error (False Negative).

FIG. 5 is a graphical depiction of extracted rules defined by complexity and error. Three solutions are highlighted in the graph of FIG. 5. These three solutions/classifiers represent three different trade-offs with respect to accuracy and complexity, starting with a classifier which is simplest but most inaccurate 504, to a solution 508 with intermediate values of classification error and complexity, and finally a solution which is very complex but highly accurate 512. For each of these solutions, the type-I and type-II errors are obtained on the test data set. The solution 508 may be referred to as a knee solution. The knee solution may be automatically selected as the solution of which the corresponding parameters are used to operate the machine.

Referring to FIG. 6, a flowchart depicting an example implementation of dimensionally aware machine learning model system generation is shown. The algorithm begins with initialization of a population 604, say of N of individuals, composed of tree structures, each with not more than n t terms or trees. The maximum depth of each tree, say $d_{max}$, is also specified at time of initialization. Then the fitness functions are invoked to evaluate 608 both error and complexity objectives for entire initial population. Then these individuals are assigned 612 non-domination ranks and crowding distances.

Once this parent population is ranked, the parent selection 616 process produces list a of parents that are allowed to reproduce children for the next generation. DAGP uses tournament selection for selecting parents to reproduce. Such a parent selection process promotes the fittest individuals in the population to mate more often. Once these parents are selected, they go through genetic operations of crossover 620 and mutation 624 to produce a child population of N individuals. DAGP uses two types of crossovers namely low-level crossover and a high-level crossover. Any two parent individuals chosen to reproduce undergo a crossover with a probability $p_c$. With a (preferably) small probability when the individuals do not go through a crossover operation, the outcome of the crossover operation is two child individuals that are identical copies of their parents.

When crossover does happen, then it can either be of high-level type with a probability of $p_{ch}$ or of low-level type with a probability $p_{cl}$=1−$p_{ch}$. Consider two individuals from the parent pool, having three and two terms respectively. Then for a high-level crossover to occur between these two individuals, DAGP randomly chooses one term from each individual to cross and then swaps them between the individuals to create two children. If a low-level crossover needs to be carried out, then DAGP first chooses one term from each parent to cross and then carries out a subtree crossover among those two terms.

After the crossover operation, the N child individuals undergo mutation operation. For an individual, a mutation is carried out with probability $p_m$ otherwise the child individual is left unchanged. In DAGP, to mutate an individual, first, one of the terms is randomly selected for carrying out the mutation operation and then a sub-tree mutation is carried out on the tree of that term.

After undergoing the crossover and mutation operations, DAGP evaluates 628 the fitness of the N child individuals. Now these N children are combined with the N parent individuals of the current generation to obtain a merged population 632 of size 2N. This population of 2N individuals is passed on to the survivor selection 636 procedure, where all the 2N individuals are again ranked and assigned crowding distances before selecting N individuals using the crowded tournament selection operator. This population of N individuals is again assigned rank and crowding distance 640 values.

If termination condition 644 is not met, these N individuals become the parent population for the next generation returning to 616. This process goes on until the termination condition is met and the final PO set of solutions is reported 648.

Figure 7:
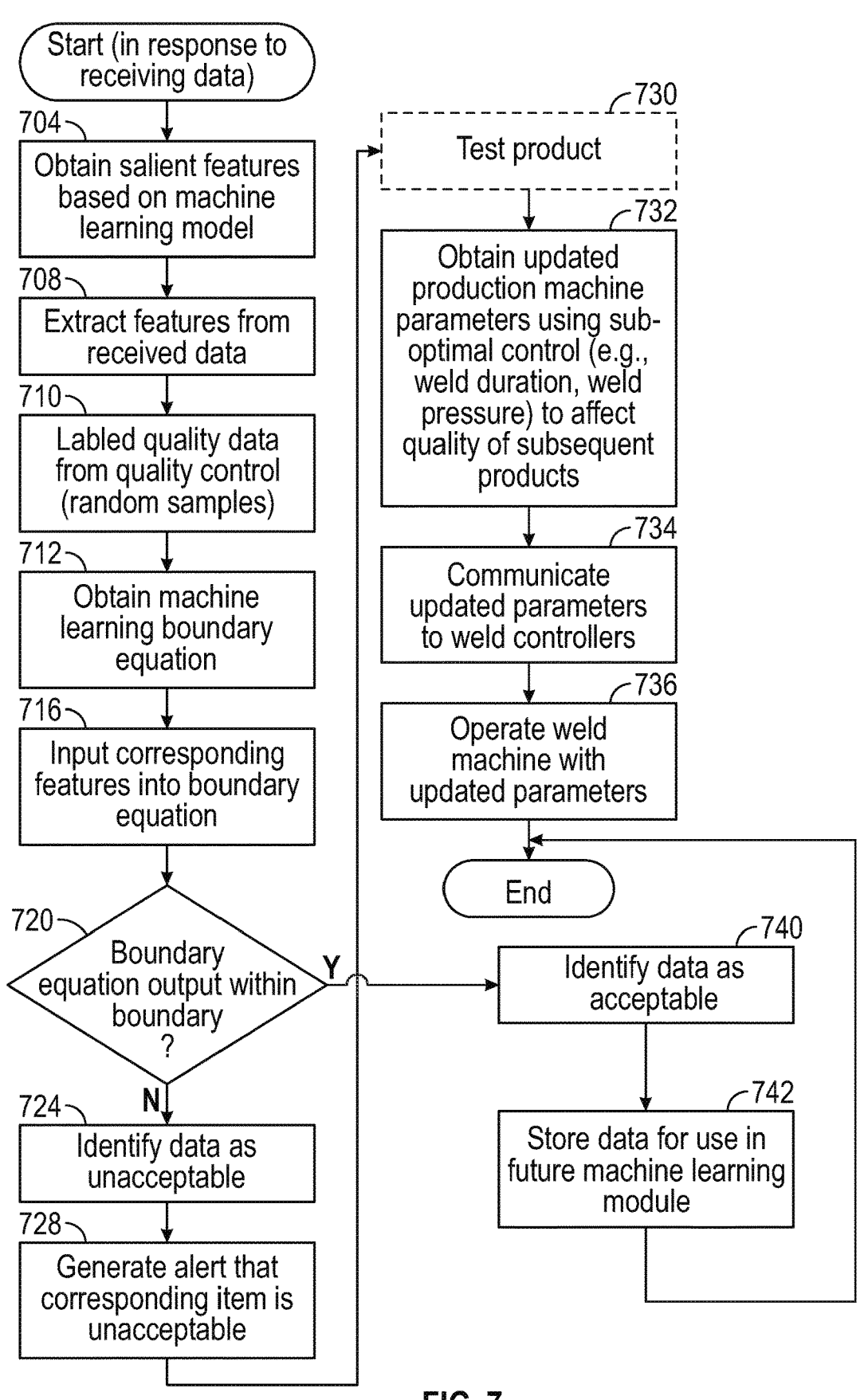
FIG. 7 is a flowchart depicting an example implementation of dimensionally aware rule extraction and classification for a production event.

Referring to FIG. 7, a flowchart depicting an example implementation of dimensionally aware rule extraction and classification for a production event is shown. Control begins in response to receiving data, for example, production data obtained during production of a particular item. Control continues to 704 to obtain salient features based on a present machine learning model being implemented. That is, control obtains which features are salient for the present model or version of the machine learning model being implemented. Then, control continues to 708 to extract the obtained features from the received data. In step 710, labeled quality control data from a quality control system may be obtained using random samples. The labels of the quality data include but are not limited to both acceptable and unacceptable data. At 712, control obtains a machine learning boundary representation equation calculated based on identified salient features within training data.

Control continues to 716 to input the corresponding features of the received data (for example, at 708 control calculates the salient features of the production data) into the boundary equation to calculate a classification value of the received data or an output. Then, control continues to 720 to determine if the boundary equation output (that is, the classification value) is within the boundary defined by the boundary equation. If no, control proceeds to 724 to identify the received data as unacceptable. As shown in FIG. 4 the received data that falls within the boundary is considered unacceptable. In various implementations, depending on the boundary equation, the inverse may be true. Then control proceeds to 728 to generate an alert that the corresponding item (the production of which resulted in the production data) is unacceptable. In various implementations, this information or data may be displayed on a user interface or a display.

The alert may trigger quality evaluation system to test the produced product or part in an optional step. Measurements of the part relates to the process. Testing such as destructive testing may be performed and measurements are determined. In step 732 updated production machine parameters using sub-optimal control such as weld duration, clamping force and sonotrode amplitude may be automatically determined based on identifying a part as unacceptable. However, testing may also be optionally considered when updating the production machine parameters.

In step 734, the updated machine parameters are communicated to the production controller such as the weld controller. The computer doing the calculating of the updated parameters may be part of the weld machine or located separately with the weld parameter communicated through the network and stored therein. Thereafter, the production machine is operated with the updated parameters such as the weld parameters. As mentioned above, clamping force, weld duration and sonotrode amplitude are examples of production parameters that may be changed. Other processes or different types of welds may have other parameters changed such as electrical current passing through a resistance welder.

Then, control ends.

Returning to 720, if the boundary equation output is within the boundary defined by the boundary equation, control continues to 740 to identify the received data as acceptable, which indicates that the item is acceptable. Control then continues to 742 to store the received data in a database for use in the development of a further machine learning model. Then, control ends.

The foregoing description of the embodiments has been provided for purposes of illustration and description. It is not intended to be exhaustive or to limit the disclosure. Individual elements or features of an embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The boundary equation is a representation of the boundary, The term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip. While various embodiments have been disclosed, other variations may be employed. All of the components and functions may be interchanged in various combinations. It is intended by the following claims to cover these and any other departures from the disclosed embodiments which fall within the true spirit of this invention.

What is claimed is:

1. A system comprising:
   a computer having at least one processor;
   a display in communication with the computer; and
   a memory coupled to the at least one processor, wherein the memory stores:
   a dimensionally aware model generated based on a training set and guided by feature dimensions and instructions for execution by the at least one processor and wherein the instructions include, in response to receiving a set of data based on output from a machine to be controlled:
   filtering anomalous data from the set of data to form a filtered set of data;
   adding synthetic data to the filtered set of data;
   identifying a set of salient features from the filtered set of data;
   applying the dimensionally aware model to the set of salient features by implementing a boundary representation that comprises an equation;

classifying the set of features as acceptable in response to the implementation of the boundary representation indicating the set of features are outside the boundary representation;

classifying the set of features as unacceptable in response to the implementation of the boundary representation indicating the set of features are inside the boundary representation;

generating an alert on the display based on the classification;

adjusting the dimensionally aware model only when classifying the set of features as acceptable;

generating updated machine parameters when the set of features is classified as unacceptable;

electronically communicating the updated machine parameters to a machine controller of the machine to be controlled; and automatically controlling the machine based on the updated machine parameters.

2. The system of claim 1 wherein automatically controlling the machine comprises automatically controlling a welding machine.

3. The system of claim 1 wherein the machine comprises a welding machine, wherein automatically controlling the machine comprises automatically controlling a weld duration, sonotrode amplitude, clamping force or all of these of the welding machine.

4. The system of claim 1 wherein the updated machine parameters are communicated through a communication link from the computer to the machine controller.

5. The system of claim 4 wherein the communication link is wired or wireless.

6. The system of claim 5 wherein the computer is separate from the machine.

7. The system of claim 5 wherein the computer is disposed within the machine.

8. The system of claim 1 wherein the set of data comprises data from a manufacturing process.

9. The system of claim 8 wherein the manufacturing process comprises welding.

10. The system of claim 1 wherein the set of data comprises time series data.

11. The system of claim 1 wherein the dimensionally aware model comprises synthetic unacceptable data.

12. The system of claim 1 wherein the alert is displayed on a display when the set of features is classified as unacceptable.

13. The system of claim 1 wherein the alert comprises haptic feedback or audible feedback when the set of features is classified as unacceptable.

14. A method of determining quality of a production event performed at a machine comprising:

obtaining, at a computer, production data comprising time series data from the machine;

filtering anomalous data from the production data to form a filtered set of data;

adding synthetic data to the filtered set of data;

extracting, at the computer, a set of salient features from the filtered set of data of the time series data corresponding to a dimensionally aware model;

determining, at the computer, a boundary equation for the production event;

obtaining, at the computer a classification value based on calculating the set of salient features into the boundary equation;

when the classification value is within the boundary equation classifying the set of salient features as unacceptable;

when the classification value is outside the boundary equation classifying the set of salient features as acceptable;

adjusting the dimensionally aware model only when classifying the set of features as acceptable;

generating updated machine parameters when the set of features is classified as unacceptable;

electronically communicating the updated machine parameters to a machine controller of the machine;

automatically controlling the machine based on the updated machine parameters; and generating, by the computer, an indicator on a display corresponding to the classification value.

15. The method of claim 14 wherein the machine comprises a welding machine, wherein automatically controlling the machine comprises automatically controlling a weld duration, sonotrode amplitude, clamping force or all of these of the welding machine.

16. The method of claim 14 further comprising communicating updated machine parameters through a communication link from the computer to the machine controller.

17. The method of claim 14 wherein generating the indicator comprises generating an alert.

18. The method of claim 17 wherein the alert is displayed on a display when the set of salient features is classified as unacceptable.

19. The method of claim 17 wherein the alert comprises haptic feedback or audible feedback when the set of salient features is classified as unacceptable.

20. The method of claim 16 wherein obtaining the production data comprises obtaining the production data from a manufacturing process.

21. The method of claim 16 wherein obtaining the production data comprises obtaining production data from a welding process.

22. The method of claim 21 wherein obtaining the production data from the welding process comprises obtaining power consumed by an ultrasonic transducer, movement data corresponding to sonotrode tip movement along a direction of a clamping force and acoustic data corresponding to a fixed ultrasonic microphone.

23. A system for classifying weld quality comprising:

a computer having at least one processor; a display; and a memory coupled to the at least one processor, wherein the memory stores:

a dimensionally aware model generated based on a training set and guided by feature dimensions and instructions for execution by the computer and the at least one processor and wherein the instructions include, in response to receiving a set of time series data comprising power data corresponding to power consumed by an ultrasonic transducer, movement data corresponding to a sonotrode tip movement along a direction of a clamping force and acoustic data corresponding to a fixed ultrasonic microphone from a machine, causing the computer to perform:

identifying a set of features from the set of time series data;

applying the dimensionally aware model to the set of features by implementing a boundary representation;

classifying the set of features as acceptable in response to the implementation of the boundary representation indicating the set of features are outside the boundary representation and adjusting the dimensionally aware model only when the set of features is classified as acceptable;

classifying the set of features as unacceptable in response to the implementation of the boundary representation indicating the set of features are inside the boundary representation;

generating, for display on the display of a user device, an alert based on the classification;

generating updated machine parameters when the set of features is classified as unacceptable;

electronically communicating the updated machine parameters to a machine controller of the machine; and automatically controlling the machine based on the updated machine parameters.

24. The system of claim 23 wherein the set of time series data is sampled at 100,000 samples per second.

25. The system of claim 23 wherein the set of time series data further comprises noise data.

26. The system of claim 23 wherein applying the dimensionally aware model to the set of features comprising implementing a plurality of boundary representations and selecting a boundary representation based on errors associated with each of the plurality of boundary representations.

27. The system of claim 23 wherein applying the dimensionally aware model to the set of features comprises removing dimensionally inconsistent data from the set of time series data.

\* \* \* \* \*